United States Patent
Sinnett et al.

(10) Patent No.: US 7,826,192 B2
(45) Date of Patent: Nov. 2, 2010

(54) METHOD AND APPARATUS FOR PREVENTING DAMAGE TO ELECTRONICS DURING TIRE INSPECTION

(75) Inventors: Jay C. Sinnett, Greenville, SC (US);
Arthur Metcalf, Kentville (CA);
George P. O'Brien, Piedmont, SC (US)

(73) Assignee: Michelin Recherche Et Technique, Granges-Paccot (CH)

( * ) Notice: Subject to any disclaimer, the term of this patent is extended or adjusted under 35 U.S.C. 154(b) by 348 days.

(21) Appl. No.: 10/581,693

(22) PCT Filed: Dec. 20, 2004

(86) PCT No.: PCT/US2004/042712
§ 371 (c)(1),
(2), (4) Date: Jul. 30, 2007

(87) PCT Pub. No.: WO2006/068637
PCT Pub. Date: Jun. 29, 2006

(65) Prior Publication Data
US 2007/0279827 A1 Dec. 6, 2007

(51) Int. Cl.
*H02H 3/22* (2006.01)
*B29D 30/00* (2006.01)
*E01C 23/00* (2006.01)

(52) U.S. Cl. .................... 361/111; 156/123; 73/146
(58) Field of Classification Search ............... 361/111; 156/123; 73/146
See application file for complete search history.

(56) References Cited

U.S. PATENT DOCUMENTS 6,725,713 B2 * 4/2004 Adamson et al. ........... 73/146.5
6,966,219 B2 * 11/2005 Starinshak ................... 73/146

* cited by examiner

*Primary Examiner*—Fritz M. Fleming
*Assistant Examiner*—Lucy Thomas
(74) *Attorney, Agent, or Firm*—Dority & Manning, P.A.

(57) ABSTRACT

Disclosed are apparatus and methodologies for protecting tire electronics from electrical discharge damage during a tire inspection procedure. Aspects of different embodiments of the disclosed subject matter relate to various techniques for providing protection from high-voltage discharge for tire electronics devices. Exemplary techniques disclosed correspond to methodologies for preventing contact with a high-voltage source, controlling conditions produced by contact with high-voltage sources, or nullifying effects of contact with high-voltage sources.

16 Claims, 6 Drawing Sheets

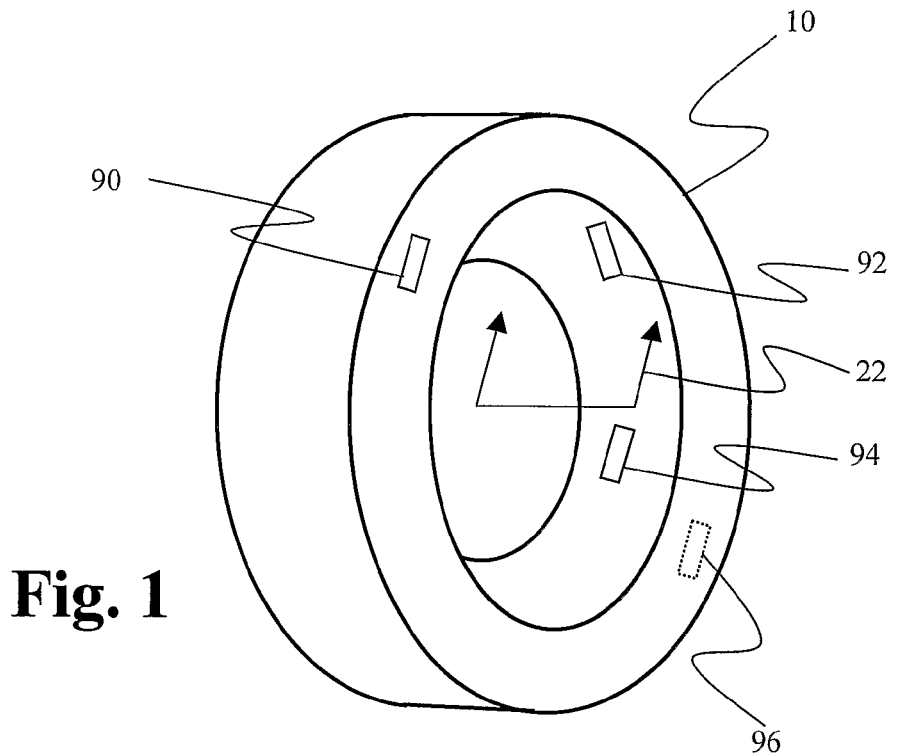
Fig. 1
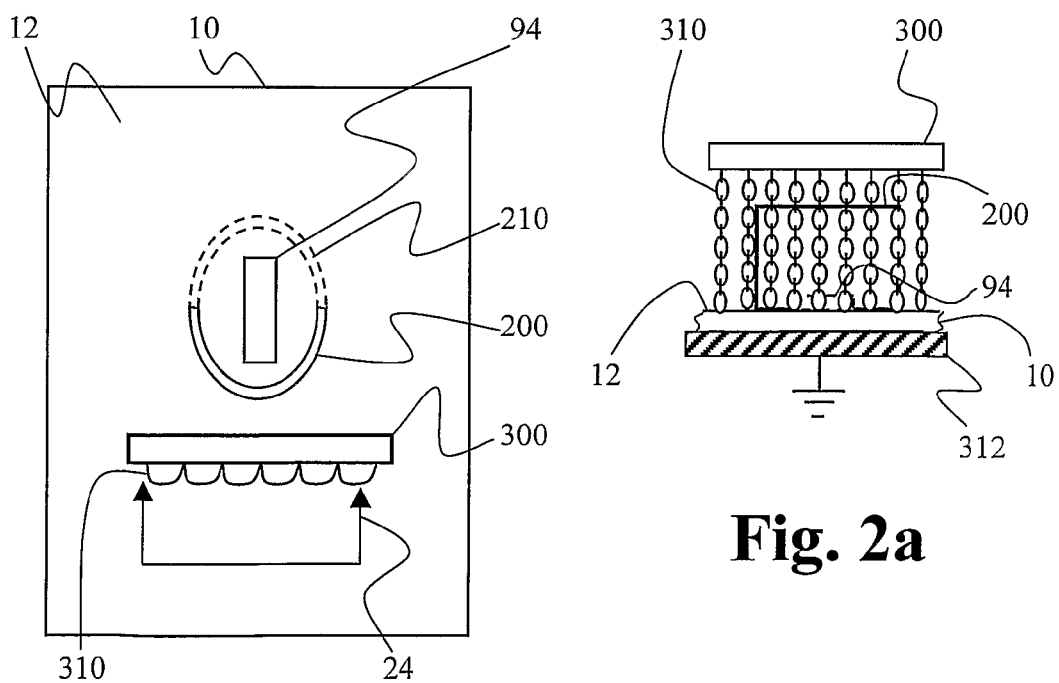
Fig. 2
Fig. 2a

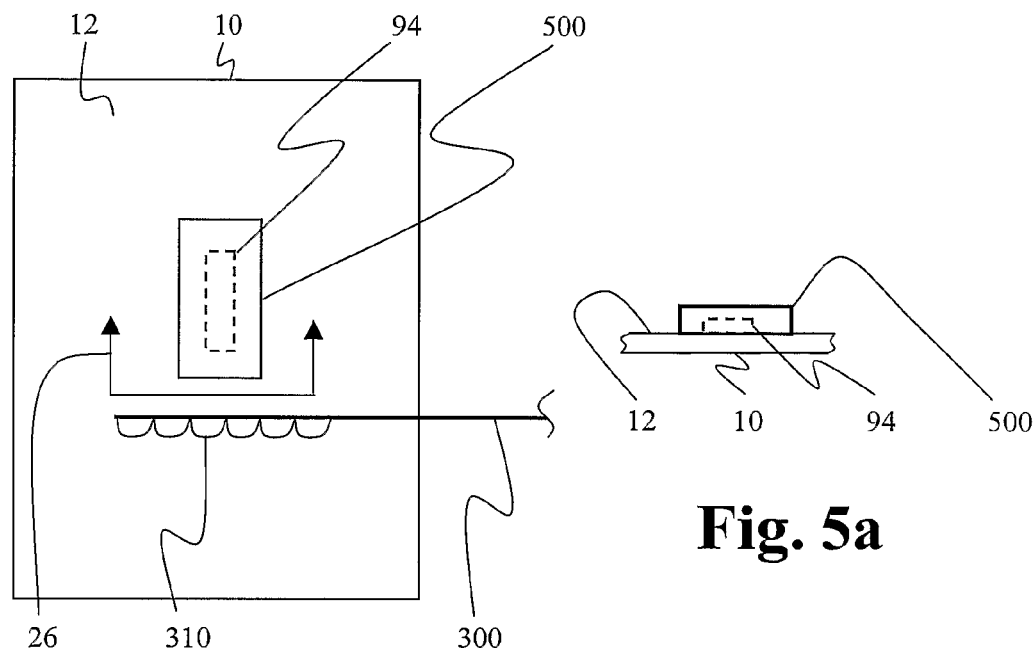
Fig. 5a
Fig. 5
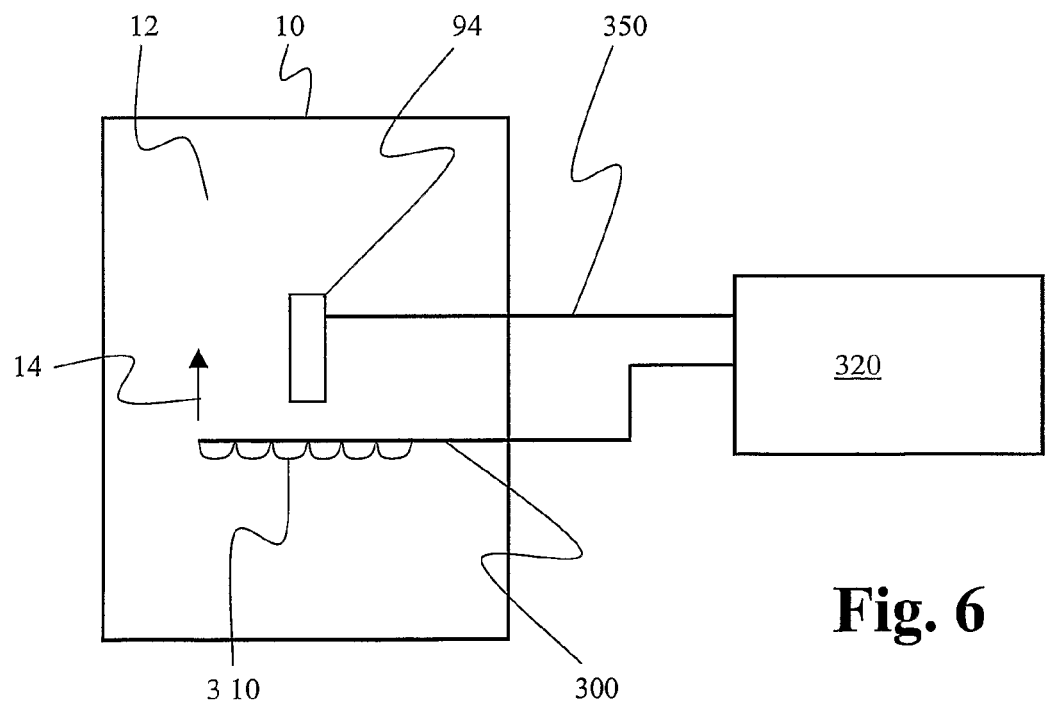
Fig. 6

METHOD AND APPARATUS FOR PREVENTING DAMAGE TO ELECTRONICS DURING TIRE INSPECTION

FIELD OF THE INVENTION

The presently disclosed technology relates to apparatus and methodologies for the protection of electronic devices from damage during an inspection or testing phase for an entity with which the electronic device is associated. The present technology has particular applicability to a tire-testing environment and the protection of associated tire electronics but is applicable to other testing environments as well.

BACKGROUND OF THE INVENTION

The incorporation of electronic devices with pneumatic tire and wheel structures yields many practical advantages. Tire electronics may include sensors and other components for relaying tire identification parameters and also for obtaining information regarding various physical parameters of a tire, such as temperature, pressure, tread wear, number of tire revolutions, vehicle speed, etc. Such performance information may become useful in tire monitoring and warning systems, and may even potentially be employed with feedback systems to regulate proper tire and/or vehicle parameters.

Yet another potential capability offered by electronics systems integrated with tire structures corresponds to asset tracking and performance characterization for commercial vehicular applications. Commercial truck fleets, aviation craft and earth mover/mining vehicles are all viable industries that could utilize the benefits of tire electronic systems and related information transmission. Radio frequency identification (RFID) tags can be utilized to provide unique identification for a given tire, enabling tracking abilities for a tire. Tire sensors can determine the distance each tire in a vehicle has traveled and thus aid in maintenance planning for such commercial systems. Vehicle location and performance can be optimized for more expensive applications such as those concerning earth-mining equipment.

As is apparent, the use of tire electronics has many practical advantages. On the other hand, the presence of such tire electronics creates certain difficulties during certain periods of a tires useful life. One particular period occurs when a tire equipped with such tire electronics is brought to a facility for recapping.

Under usual circumstances, when a tire is presented for recapping, the tire may be tested for defects that may preclude recapping or present issues that need to be addressed during the recapping process. One commonly used method for inspecting a tire for damage prior to recapping such tire involves the use of a high voltage probe in the form of a wire. During tire inspection, a high voltage energized wire loops are brushed against the interior of the tire so that sparks may jump from the wire to the site of a defect thereby revealing any defects. Such high voltage discharges may be damaging to the tire electronics, and moreover, the wire itself may mechanically snag on an electronics package causing mechanical damage to the tire electronics package.

While various implementations of tire electronics systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved methodologies for protecting tire electronics from damage during a tire inspection process have been developed.

In accordance with aspects of certain embodiments of the present subject matter, methodologies are provided to physically protect any installed tire electronics from coming into electrical contact with a high-voltage charged electrical wire.

In accordance with certain aspects of other embodiments of the present subject matter, methodologies have been developed to provide electrical protection for any installed tire electronics despite physical contact with a high-voltage energized wire.

In accordance with yet additional aspects of further embodiments of the present subject matter, apparatus and accompanying methodologies have been developed to provide tire electronics packages with self-protecting features to lessen the likelihood of high-voltage induced damage.

According to yet still other aspects of additional embodiments of the present subject matter, apparatus and methodologies have been developed to reduce the likelihood of electrical discharge damage being produced by the testing equipment itself.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 diagrammatically illustrates the combination of a tire and alternative locations for tire electronic devices;

FIGS. 2 and 2a represent plan and side cross sectional views of a first embodiment of the present subject matter providing physical protection of a tire electronics device;

FIG. 5 representatively illustrates plural further embodiments of the present technology wherein plural types of materials having a variety of electrical properties may be employed to provide protection of a tire electronics device;

FIG. 6 illustrates yet another embodiment of the present technology wherein counter voltages are applied to the tire electronics device;

Figure 3:
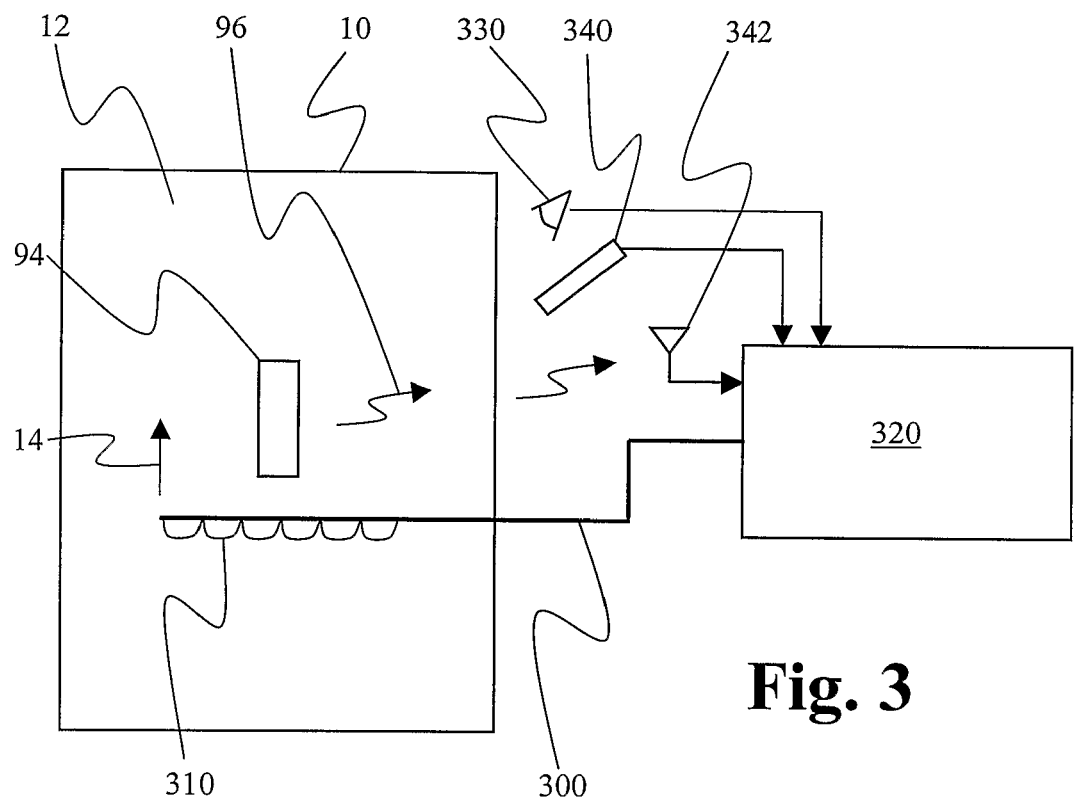
FIG. 3 illustrates plural additional embodiments of the present technology providing manual or automated control of a power supply.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with the protection of electronic devices from damage during a testing phase for an entity with which the electronic device is associated and, in particular, with the protection of tire electronics devices during a tire testing operation that is particularly associated with a recapping operation. As previously noted, however, the present technology is not limited to such a tire testing environment as the technology has applicability in other environments as well.

It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the present subject matter. Referring now to the drawings, FIG. 1 illustrates therein several alternative locations where tire electronics devices may be mounted in, on or within a tire in accordance with certain aspects of the present technology. As illustrated in FIG. 1, one or more tire electronics devices may be associated with tire 10 by mounting such devices on the outside of the side wall as at 90, on the crown of the tire as at 92, on the inside of the sidewall as at 94, or physically embedded within the tire structure as illustrated by the dotted line rectangle at 96. Any, some, or all of these locations might be used for tire electronics device locations in any one tire. Moreover, plural tire electronics devices may be arranged such that a plurality of conditions or plural conditions from plural locations may be more easily detected to obtain the widest possible range of discernable data.

It should be borne in mind that, as previously noted, although the principle discussion with respect to the present technology is directed to the testing of tires and methodologies for the protection of electronic devices associated with such tires, the present disclosure is not so limited. In particular various protection methodologies described herein may also be applicable in other environments where different testing techniques may be applied and wherein electronic devices associated with devices or items under test in such environments undesirably may be subject to damage as a result of such testing techniques. Non-limiting examples of such testing environments may include testing associated with EMP (Electro Magnetic Pulse) and lightning.

With reference now to FIGS. 2 and 2a, there is illustrated a plan and side cross-sectional view (taken along a view represented by arrows 24 of FIG. 2) of a first embodiment of the present technology. As illustrated in FIGS. 2 and 2a, a portion of a tire 10 corresponding to a portion as may be seen by way of a view represented by arrows 22 (FIG. 1) shows a tire electronics device 94 secured to an inside surface 12 of tire 10. In this embodiment, a semicircular insulative protective structure taking the form of a wall 200 is positioned perpendicular to inside tire surface 12 to provide physical protection for tire electronics device 94 from contact by wires 310. Wires 310 may take the form of conductive keychains. As shown, the protective wall 200 at least partially surrounds tire electronics device 94 and may, by way of optional wall portion 210 completely surround the tire electronics device 94.

During a tire testing operation, wires 310 brush across the inside surface 12 of tire 10. In an actual test, tire 10 may be rotated while wires 310 remain stationary to produce relative motion between the tire 10 and wires 310. By virtue of being coupled by way of metal header 300 to a high-voltage power supply (not shown), brushing wires 310 across the tire surface 12 will result in a spark between one or more of wires 310 and any defect in the tire to a grounded conductive plate or roller 312 (not shown in FIG. 2). The provision of insulative protective wall 200 and its optional extension 210 prevents wires 310 from coming into contact with tire electronics device 94 thereby protecting the device from damaging electrical discharge. As a non-limiting example, the high voltage supply coupled via metal header 300 to wires 310 may correspond to a supply having a peak output of about 80 kV DC.

With reference to FIG. 3, there are illustrated other embodiments of the present subject matter. In these embodiments, tire electronics device protection is provided by way of manual and/or automatic control of the high-voltage power supply. In a manner similar to that illustrated in FIGS. 2 and 2a, tire 10 may be advanced in the direction of arrow 14 so that the wires 310 brush against the inside surface 12 of tire 10. Wires 310 are connected by way of metal header 300 to high-voltage power supply 320 so that sparks may be produced between one or more of the wires 310 and any defects as may be present in the tire 10 to a grounded conductive plate or roller (not shown) similar to that illustrated in FIG. 2a at 312.

As tire 10 moves such that tire electronics device 94 mounted on the inside surface 12 of tire 10 approaches wires 310, an equipment operator through visual inspection 330 and/or an automated control through magnetic or optical proximity sensor 340 may effect control of high-voltage power supply 320 so as to reduce the output voltage of the high-voltage supply as the tire electronics device 94 approaches wires 310 to a level sufficient to permit non-destructive contact of the tire electronics device 94 with wires 310. The output voltage of the high-voltage power supply 320 may be reduced to zero (i.e., the high-voltage supply may be cut off) or reduced to a safe contact level for the tire electronics device 94.

Further illustrated in FIG. 3 is yet another alternative embodiment of the present technology wherein the electronic device 94 itself may be employed as a sensor either alone or in combination with the previously discussed sensors to control the high voltage power supply. In particular, as the electronic device 94 approaches the test wires 310, the electronic device 94 may be configured to detect the presence of a potentially damaging electric field and to transmit such information by way of radio frequency (RF) radiation 96 or other suitable form of information transmission to a receiving element 342 associated with the power supply 320. Again the output voltage of the high-voltage power supply 320 may be reduced to zero or reduced to a safe contact level for the tire electronics device 94. Alternative power supply control methodologies as will be more fully described later with respect to FIGS. 8 and 8*a* may also be put in place and employed with the several embodiments illustrated in FIG. 3.

Figure 4:
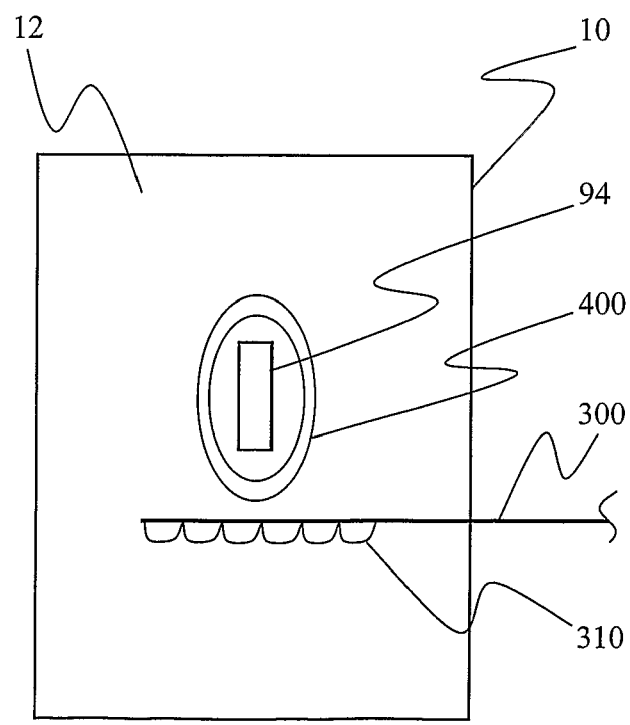
FIG. 4 illustrates a further embodiment of the present technology providing conductive protection of a tire electronics device.

FIG. 4 illustrates yet another embodiment of the present subject matter. Generally the same testing procedure is conducted in the embodiment illustrated in FIG. 4 as may be carried out in the previously described embodiments. An energized set of wires 310 coupled via metal header 300 to a high-voltage power supply (not shown) are brushed across the inside surface 12 of tire 10 as tire 10 is rotated. As the tire electronics device 94 approach wires 310, the wires 310 encounter a conductive guard ring 400 surrounding the tire electronics device 94. Guard ring 400 may be temporarily or permanently placed around the tire electronics device 94 and operates to attract sparks from the high-voltage energized wires 310 to an impervious component instead of the sensitive electronics. Conductive guard ring 400 may correspond to a ring of any suitable conductive material including, but not limited to conductive metals as well as conductive compositions including as a non-limiting example, conductive rubber.

With reference now to FIGS. 5 (a plan view) and 5*a* (a side cross-sectional view along arrows 26 of FIG. 5), fourth, fifth, and sixth exemplary embodiments of the present subject matter will now be described. As with the previously described embodiments, similar tire testing procedures, whose complete description will not be repeated here, may be followed. Moreover, as with previous embodiments, tire 10 may rest on a conductive plate or roller (not shown) functioning as a ground return for the high voltage power supply (not shown) coupled to metal header 300.

According to the embodiments to be presently described, a number of protective features may be employed to lend protection to tire electronics device 94, all of which, from a drawing standpoint, appear to be similar. Each of these embodiments, however, involve tire electronic device protection methodologies wherein a covering 500 of varying electrical properties is either temporarily or permanently applied over the tire electronics device 94.

In a first of these embodiments, an insulating cover 500 is temporarily or permanently installed over the tire electronics device 94 thereby preventing formation of electronics damaging sparks. A second embodiment provides for the temporary or permanent installation of a conductive cover 500 over the tire electronics device 94 thereby providing a Faraday shield configuration that draws an arc from the high-voltage energized wires 310 but prevents any voltage gradients within the package forming the tire electronics device 94.

Finally a third, preferred configuration for the embodiments illustrated in FIGS. 5 and 5*a* corresponds to a resistive material cover 500 over the tire electronics device 94. Such a resistive material cover 500 may or may not allow an arc to form but controls both the magnitude and the rate-of-rise of the current in the material to levels that are not damaging to the tire electronics device 94. As a non-limiting example of suitable resistive materials, carbon impregnated rubber may be employed with the carbon particle concentration being adjusted to achieve magnitude and rate-of-rise of current limitations as desired.

FIG. 6 represents yet another embodiment of the present subject matter that has some similarity to the previously described Faraday cage configuration described with reference to FIG. 5. In particular, the embodiment of FIG. 6, in addition to substantially the same tire testing process as previously described, illustrates the application of a high-voltage via cable 350 from power supply 320 directly to the tire electronics device 94. The high-voltage applied to tire electronics device 94 via cable 350 is at substantially the same level as the high-voltage applied via metal header 300 to wires 310. Since there is no voltage potential or gradient between the two substantially equal value voltage potentials, no spark will be generated between the wires 310 and tire electronics device 94.

Figure 7:
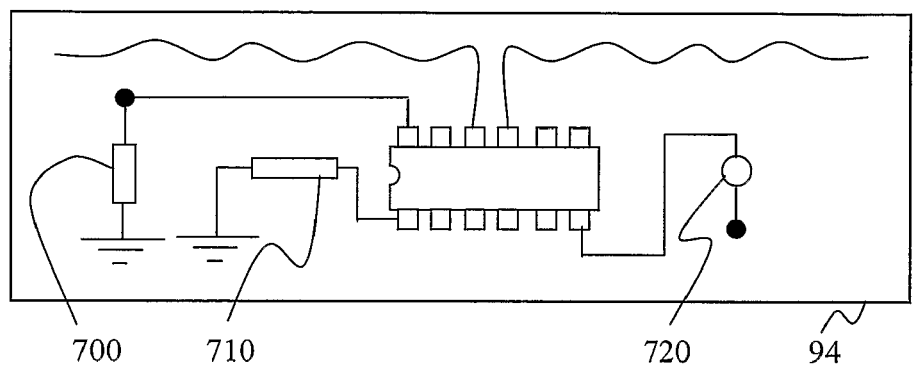
FIG. 7 illustrates an embodiment of the present technology wherein the tire electronics device is made self protective.

Turning now to FIG. 7, two additional embodiments of the present subject matter are illustrated. In these embodiments of the present subject matter, attention is given to the tire electronics device 94 itself to provide a form of self-protection from the adverse effects encountered during the tire testing process.

In a first of these self-protecting embodiments the tire electronics device packaging is designed to provide longer insulating paths within the device itself thereby inhibiting arc formation between the high-voltage energized testing wires and the electrical components within the tire electronics device 94.

Another embodiment corresponding to a second self-protective form of the present subject matter corresponds to the provisioning of static dissipative elements within the tire electronics device 94. For example, elements 700, 710, and 720 exemplarily illustrated as coupled to various terminals within tire electronics device 94 may correspond to various known static-discharging elements. Non-limiting examples of such elements correspond to high value resistors, spark gap devices, non-linear resistors, capacitors, neon lamps, valve block material, varistors, and other devices capable of safely dissipating a high voltage charge.

As should be evident to those of ordinary skill in the art, features of both these forms of self-protection may be combined to, for example, provide both longer insulating paths and at least one or some of the individual static dissipative elements 700, 710, 720 together in the same package forming the housing for a tire electronics device 94.

Figure 8:
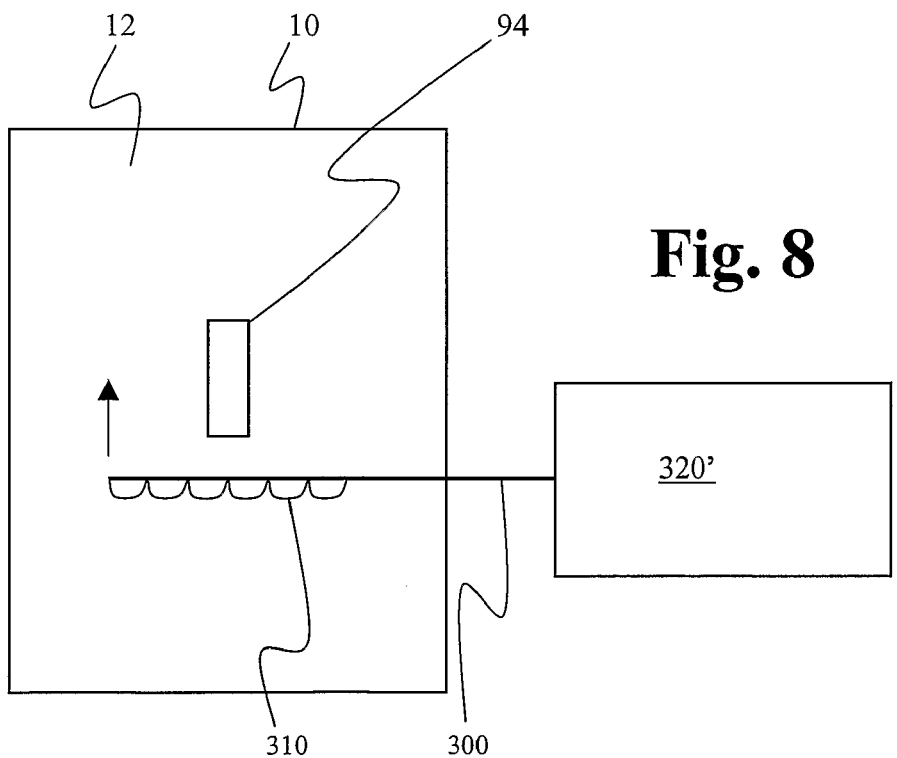
FIGS. 8 and 8a illustrate yet still another embodiment of the present technology wherein the high voltage power supply is controlled to reduce the possibility of damage to the tire electronics device.
Figure 8A:
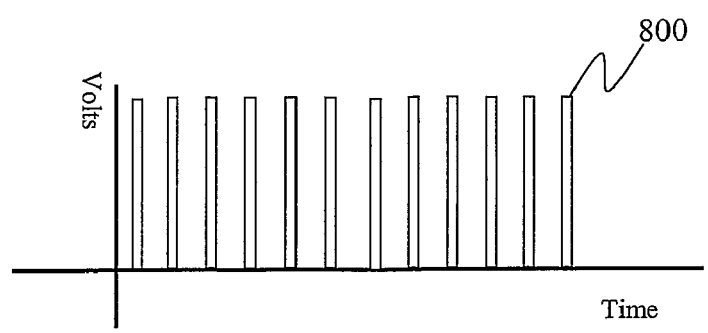

With respect now to FIGS. 8 and 8*a*, the adverse effects of high-voltage discharge on a tire electronics device may be addressed by considering the high-voltage source itself. As illustrated in FIG. 8 the testing procedure correspond to previously described procedures. In fact the mechanics of the procedure, i.e., the brushing of energized wires 310 over the inside surface 12 of a tire 10 as tire 10 rotates, are identical. The difference here resides in the high-voltage generator 320'.

As best illustrated in the graph corresponding to FIG. 8*a*, the power supply 320' is configured such that the high-voltage generated thereby applied to wires 310 via metal header 300 corresponds to a series of very short, high-voltage pulses 800, separated by longer periods when the wires are not energized. Thus the effective energy applied to wires 310 is insufficient to cause any damage to the tire electronics device 94. The very short pulses 800 still give information, in the form of generated sparks, about tire defects, but carry so little energy that they do not damage the electronics within the tire electronics device 94.

Figure 9:
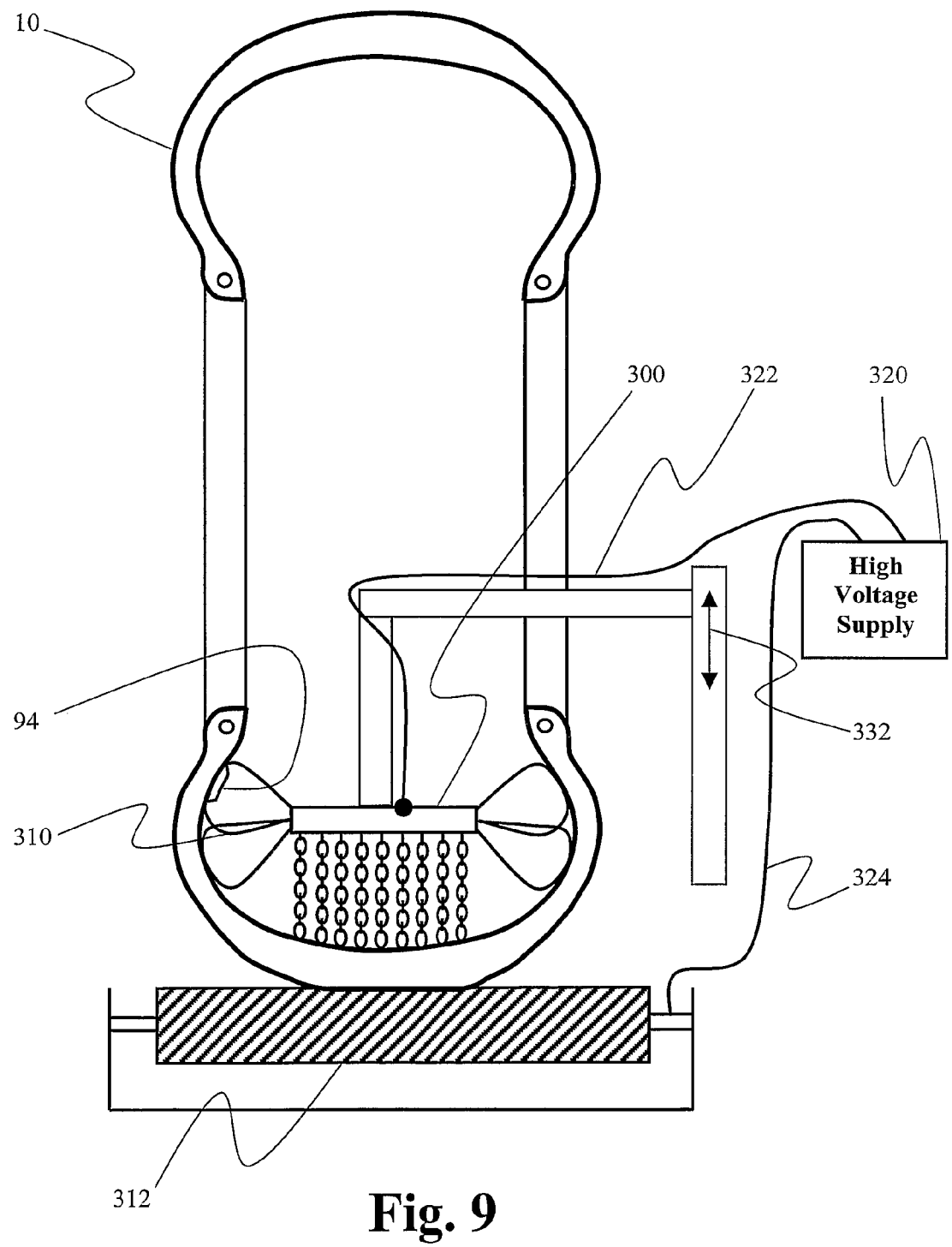
FIG. 9 illustrates a more detailed view of the tire testing configuration employed with the present technology.

FIG. 9 illustrates a more detailed view of an exemplary tire-testing configuration that may be employed with the present technology. The tire testing equipment operates by supporting a tire 10 on one or more grounded conductive rollers 312. A support arm 330 constructed of insulative material supports metal header 300 and may be moved up and down by un-illustrated drive means as indicated by double headed arrow 332. One output lead from high voltage supply 320 is coupled via a cable 322 to metal header 300 and from there to test wires 310. Another output lead from high voltage supply 320 is coupled via a cable 324 to conductive roller 312. As illustrated test wires 310 may correspond to one portion constituting a pair of butterfly wing shaped wires that, with tire rotation, are configured to sweep the inner surface of the sidewall portion of tire 10 and a second portion constituting a set of conductive key chains suspended from metal header 300. As illustrated in FIG. 9, a tire electronics device 94 may be secured to the inside sidewall portion of tire 10 and is swept over by the butterfly wing shaped portion of test wires 310. Any of the various protective measures previously discussed herein above may be employed with the structure illustrated to protect tire electronics 94 from damage due to contact with or proximity to energized test wires 310.

Figure 10:
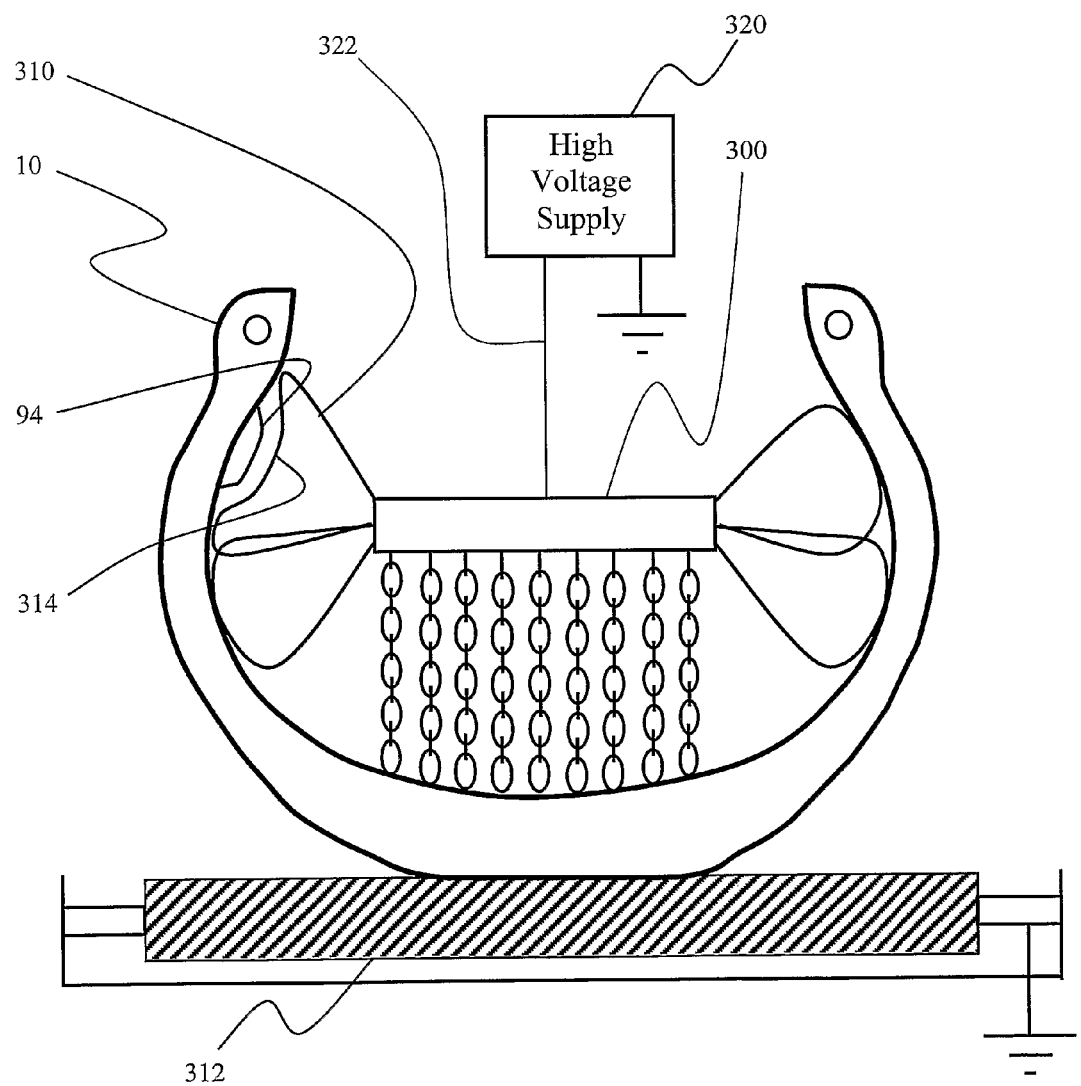
FIG. 10 illustrates yet still a further embodiment of the present technology wherein test wires are configured to avoid installed tire electronics.

FIG. 10 illustrates yet another alternative embodiment of the present technology wherein the shape of the butterfly wing shaped portion of wires 310 themselves may be configured so as to avoid contact with areas where tire electronics devices may be mounted. As exemplarily illustrated in FIG. 9, tire electronics device 94 may be mounted in the interior of tire 10 in a sidewall area. Testing wires 310 are coupled via cable 322 and metal header 300 to a high-voltage power supply and tire 10 may be supported on grounded conductive plate 312 as previously discussed. Portions of the butterfly wing portion of testing wires 310 may then be shaped, for example as illustrated in area 314, so as to avoid contact with any tire electronics device 94 that may be mounted in the designated area. Of course, tire electronics device 94 may be mounted in a number of different locations as was illustrated in FIG. 1, thus the present technology contemplates modification of the testing wire shape to accommodate any such mounting locations.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for preventing damage to tire electronics during tire inspection, comprising the steps of:
   providing a high-voltage power supply;
   providing a tire containing at least one tire electronics device mounted directly on a surface of the tire;
   providing a conductive wire;
   coupling one end of the conductive wire to the high-voltage supply;
   configuring the other end of the conductive wire for contact with the tire; and
   providing an insulative wall perpendicular to the tire surface and in proximity to but not covering the at least one tire electronics device such that contact with the tire electronics device by the end of the conductive wire configured for contact with the tire is inhibited by the insulative wall.

2. The method of claim 1, wherein the insulative wall at least partially surrounds the at least one tire electronics device.

3. The method of claim 2, wherein the insulative wall surrounds the at least one tire electronics device.

4. A method for preventing damage to tire electronics during tire inspection, comprising the steps of:
   providing a high-voltage power supply;
   providing a tire containing at least one tire electronics device;
   providing a conductive wire;
   coupling one end of the conductive wire to the high-voltage supply;
   configuring the other end of the conductive wire for contact with the tire; and
   controlling the effective energy impressed on the at least one tire electronics device, whereby damage to the tire electronics from effects of the high-voltage source is avoided.

5. The method of claim 4, wherein the step of controlling comprises controlling the effective energy supplied from the high-voltage power supply.

6. The method of claim 5, wherein the step of controlling comprises reducing the effective energy of the high-voltage power supply at least when the end of the wire configured for contact with the tire is proximate to the at least one tire electronics device.

7. The method of claim 6, wherein the step of controlling comprises manually reducing the effective energy of the high-voltage power supply at least when the end of the wire configured for contact with the tire is proximate to the at least one tire electronics device.

8. The method of claim 6, wherein the step of controlling further comprises the steps of:
   providing a sensor having an output signal responsive to proximity of the wire configured for contact with the tire to the at least one tire electronics device; and
   automatically reducing the effective energy of the high-voltage power supply in response to the output signal.

9. The method of claim 6, wherein the step of controlling further comprises the steps of:
   configuring the at least one tire electronics device to provide an output signal responsive to proximity of the wire configured for contact with the tire to the at least one tire electronics device; and
   automatically reducing the effective energy of the high-voltage power supply in response to the output signal.

10. The method of claim 5, wherein the step of controlling comprises configuring the high-voltage power supply to supply a series of relatively short high-voltage pulses sufficiently separated in time to produce an effective low-energy waveform, whereby the effective energy provided from the high-voltage power supply is insufficient to damage the at least one tire electronics device.

11. The method of claim 4, wherein the step of controlling the effective energy comprises applying a potential substantially equivalent to the potential of the high-voltage power supply to the at least one tire electronics device, whereby substantially no voltage gradient will be produced between the at least one tire electronics device and the end of the wire configured for contact with the tire.

12. The method of claim 4, wherein the step of controlling the effective energy comprises incorporating one or more static dissipative elements within the at least one tire electronics device.

13. The method of claim 12, wherein the one or more static dissipative elements are selected from the group consisting of high-value resistors, spark gaps, non-linear resistors, varistors, capacitors, neon lamps, and valve block materials.

14. The method of claim 4, wherein the step of controlling the effective energy comprises incorporating insulating pathways within the at least one tire electronics device, thereby inhibiting arc formation.

15. The method of claim 4, wherein the step of controlling the effective energy comprises surrounding the at least one tire electronics device with a conductive guard ring.

16. The method of claim 4, wherein the step of controlling the effective energy comprises configuring at least a portion of the other end of the conductive wire for contact with the tire so as to avoid contact with the at least one tire electronics device.

* * * * *